(12) United States Patent
Phan et al.

(10) Patent No.: US 8,966,486 B2
(45) Date of Patent: Feb. 24, 2015

(54) DISTRIBUTED MULTI-PHASE BATCH JOB PROCESSING

(75) Inventors: Thomas Phan, San Jose, CA (US); Jingren Zhou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 13/099,814

(22) Filed: May 3, 2011

(65) Prior Publication Data

US 2012/0284719 A1 Nov. 8, 2012

(51) Int. Cl.
G06F 9/46 (2006.01)
G06F 9/48 (2006.01)

(52) U.S. Cl.
CPC .................. *G06F 9/4843* (2013.01)
USPC ....................................... 718/101

(58) Field of Classification Search
None
See application file for complete search history.

(56) References Cited

U.S. PATENT DOCUMENTS

| | | | |
|---|---|---|---|
| 5,161,223 A | 11/1992 | Abraham | |
| 5,844,554 A * | 12/1998 | Geller et al. | 715/744 |
| 7,721,287 B2 | 5/2010 | Wu | |
| 7,757,234 B2 | 7/2010 | Krebs | |
| 7,778,998 B2 * | 8/2010 | Gupta | 707/714 |
| 2003/0132958 A1 * | 7/2003 | Himmel et al. | 345/745 |
| 2003/0187907 A1 * | 10/2003 | Ito | 709/102 |
| 2005/0204034 A1 * | 9/2005 | Betarbet | 709/224 |
| 2008/0097988 A1 * | 4/2008 | Broder et al. | 707/5 |
| 2010/0088704 A1 * | 4/2010 | Ringseth et al. | 718/102 |
| 2010/0211939 A1 * | 8/2010 | Ali | 717/143 |
| 2010/0287014 A1 * | 11/2010 | Gaulin et al. | 705/7 |

OTHER PUBLICATIONS

Secure Outsourced Database Architecture(Ahmed et al. May 2010).*
P. Buncic et al., "Architectural Roadmap Towards Distributed Analysis" Oct. 31, 2003, pp. 1-32, (ARDA) Report of the LHC Computing Grid Project's Requirements and Technical Assessment Group (RTAG); Document Identifier CERN-LCG-2003-033; http://citeseerx.ist.psu.edu/viewdoc/download? doi=10.1.1.90.4249&rep=rep1&type=pdf.
Ahmed M.A. Al Thneibar et al., "Secure Outsourced Database Architecture" May 2010, pp. 246-255, IJCSNS International Journal of Computer Science and Network Security, vol. 10, No. 5, http://paper.ijcsns.org/07_book/201005/20100536.pdf.

(Continued)

*Primary Examiner* — Emerson Puente
*Assistant Examiner* — Sisley Kim
(74) *Attorney, Agent, or Firm* — Kim Sung; Leonard Smith; Micky Minhas

(57) ABSTRACT

A distributed job-processing environment including a server, or servers, capable of receiving and processing user-submitted job queries for data sets on backend storage servers. The server identifies computational tasks to be completed on the job as well as a time frame to complete some of the computational tasks. Computational tasks may include, without limitation, preprocessing, parsing, importing, verifying dependencies, retrieving relevant metadata, checking syntax and semantics, optimizing, compiling, and running. The server performs the computational tasks, and once the time frame expires, a message is transmitted to the user indicating which tasks have been completed. The rest of the computational tasks are subsequently performed, and eventually, job results are transmitted to the user.

16 Claims, 6 Drawing Sheets

(56) References Cited

OTHER PUBLICATIONS

David J. Dewitt et al., "Clustera: An Integrated Computation and Data Management System" Aug. 23-28, 2008, pp. 28-41, PVLDB '08, Auckland, New Zealand, Copyright 2008 VLDB Endowment, ACM 978-1-60558-305-01/08/08, http://www.google.co.in/url?sa=t&source=web&cd=2&ved=0CCAQFjAB&url=http%3A%2F%2Fciteseerx.ist.psu.edu%2Fviewdoc%2Fdownload%3Fdoi%3D10.1.1.140.7517%26rep%3Drep1%26type%3Dpdf&ei=RzleTfvOOo6r8QPz4NVZ &usg=AFQjCNF_EHvlj5AmU1EeMDQJll5sLzJulA.

Stanley Lam, "PatternFinder in Microsoft Amalga: Temporal Query Formulation and Result Visualization in Action" Spring 2008, pp. 1-21, University of Maryland, Department of Computer Science, Honors Paper for Spring 2008 under the supervision of Dr. Ben Shneiderman, http://citeseerx.ist.psu.edu/viewdoc/download-?doi=10.1.1.145.1403&rep=rep1&type=pdf.

\* cited by examiner

US 8,966,486 B2

DISTRIBUTED MULTI-PHASE BATCH JOB PROCESSING

BACKGROUND

Today's distributed online environments use clusters of servers to store and manage everything from e-mail accounts, web searching, online advertising, and numerous other cloud-based functions. Companies providing cloud-scale services need to store and analyze massive data sets, such as search logs and click streams. Mining this data provides valuable insights into software performance, user interactions, and numerous other key information. Programmers analyze the data by submitting backend queries commonly referred to as "jobs" that are executed by backend servers through an online portal.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention is directed to one or more communicatively connected processing servers receiving and executing batches of job queries for data sets on a backend storage server. A user submits a job, usually in the form of a script, to the processing server. The processing server identifies several compilation tasks to be completed on the job and identifies a time frame to complete some of the tasks. Examples of computational tasks include, without limitation, preprocessing, parsing, importing, verifying dependencies, retrieving relevant metadata, checking syntax and semantics, optimizing, compiling, and running. The processing server then begins performing the computational tasks, and after expiry of the time frame, a message is transmitted to the user indicating which tasks have been completed. The rest of the computational tasks are subsequently performed, and eventually, job results are transmitted to the user.

Another aspect is directed to processing jobs in a distributed batch query-processing platform. Upon receipt of a job submitted by a user, computational tasks are identified. The tasks are strategically arranged in an order for completion, and a time frame for completing several of the computational tasks is identified. The time frame may be based on the amount of time an online connection stays open to the user or dynamically based on the level of complexity of different computational tasks and/or the job itself. The tasks are eventually processed, and a message is sent to the user indicating which computational tasks have been completed within the time frame.

Another aspect is directed to a server configured to process batches or jobs. The server contains one or more processors configured to execute different components within a predefined time frame. A schema validation component verifies the syntax of a job submitted by a user. A data validation component verifies that data indicated in the job is stored on database servers. An optimizer optimizes the job for faster execution. A compiler compiles the optimized job. After the time frame expires, the server may transmit a message to the user, indicating computational tasks that have been performed during the predefined time frame.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
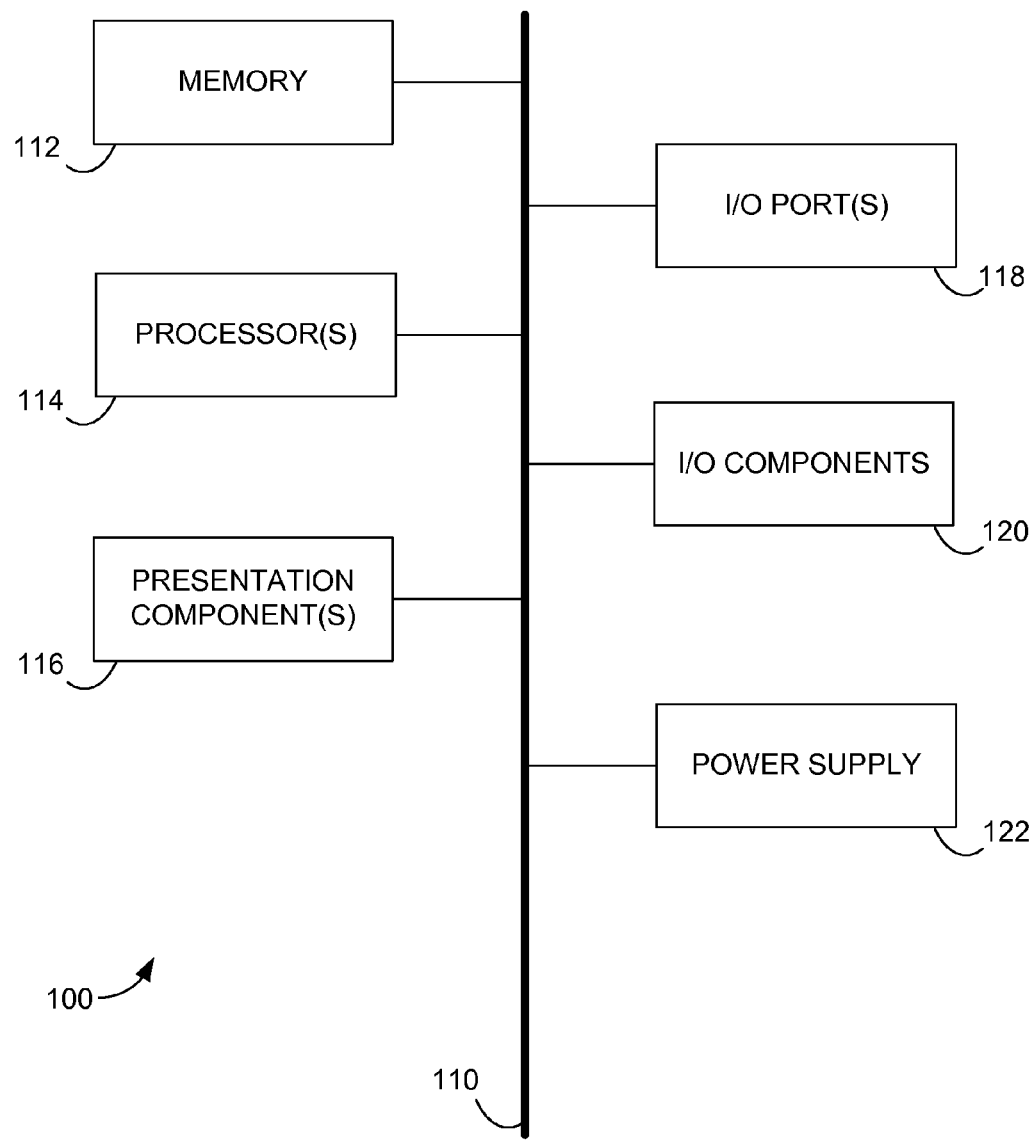
FIG. 1 is a block diagram of an exemplary computing device, according to one embodiment.

The subject matter described herein is presented with specificity to meet statutory requirements. The description herein is not intended, however, to limit the scope of this patent. Instead, the claimed subject matter may also be embodied in other ways, to include different steps or combinations of steps similar to the ones described in this document, in conjunction with other present or future technologies.

Internet companies typically store massive data sets, such a search logs, web content collected by web crawlers, and click streams collected by a variety of web services. To analyze the data, the companies use distributed processing platforms, consisting of clusters of processing servers that access backend storage servers to answer user queries about stored data sets. These user queries are commonly referred to as "jobs," which one skilled in the art will understand are user-submitted computer programs, often in the form of scripts, seeking information about the data sets. Jobs are typically coded in some form of scripting language, such as the declarative language known as structured computations optimized for parallel execution ("SCOPE") or using standard query language ("SQL") expressions. Other scripting languages may alternatively be used by the embodiments described herein.

By submitting a job, a user is requesting analysis of a data set stored in the cloud on some database storage server. Examples of jobs are far too numerous to list herein, only a few are provided. For example, job 202 may query for the number of males of a certain age clicking on an online advertisement. In another example, job 202 may be querying for the number of times a stock price continues to rise after crossing over a particular moving day average. In yet another example, job 202 may query for the number of times—or percentage of users—who navigate to a checkout screen of an e-commerce site but then navigate away without purchasing a specific product, thus indicating a strong likelihood that the product price is too high. Again, various queries may be submitted as job 202, and the specifics of those queries will not limit the embodiments described herein.

Processing servers receive jobs from submitting users and perform several computational tasks to execute the jobs. While not an exhaustive list by any means, the processing servers may perform the following computational tasks to answer the job query: check syntax, check semantics, read or retrieve metadata, determine data size, optimize the job query, generate programming code (e.g., C, C++, C#, or JAVA) based on the job query, compile the job query, generate an executable for the job query, and/or run the executable.

One embodiment performs these computational tasks in different time frames. In a first time frame, several less computationally intense preparatory tasks are performed (e.g., syntax check, semantics check, metadata retrieval, data size determinations), a message confirming completion of these preparatory tasks is sent to a user's client computer, and the connection between the user's client computer and the processing server is closed. The processing server completes the more computationally intense tasks (e.g., query optimization, code generation, compiling, executable generation, and execution) during a second time frame, which may be performed after the user's client computer is no longer connected with the processing server.

Completing different preparatory and compilation phases on job queries is further complicated by a plurality of factors, including but not limited to network time constraints and user satisfaction while waiting for the job submission to complete. In one embodiment of the invention, the primary concern may be network time constraints. Upon submission of a job query, a user may only have a certain amount of time in an online connection to a processing server. If the user's job query has not progressed through the multiple preparatory, optimizing, and/or compilation phases before time expires, the job may not be completed. Or, even worse, a user may have to wait the specified time frame just to be informed that the query could not be compiled or executed in time. Therefore, computational tasks may need to be completed in a certain amount of time or else a user's client computer may lose connection to the processing server. For example, an "HTTP 408 Error" may be issued if the client computer waits too long to receive data from the processing server, or the network connection between the client computer and the processing server may go down due to other network issues.

Also, user satisfaction may wane while waiting for a job query to be completed, especially if the user must wait for a while. Therefore, in one embodiment, the timeframes for performing different preparatory and/or computational tasks may be set based on providing a user with a response in a relatively short period of time. For example, a timeframe may be set to perform certain tasks within seven seconds of the user submitting a job query, and after seven seconds, a response the user is notified about what tasks have been completed or what tasks could not be completed due to faulty script or code of the job query.

Optimization of a job query's script, or underlying code, may be based on a computation "cost" of logically equivalent rewrites of the portions of the script. Computation costs, as referred to herein, are estimates of processing resources necessary to execute a portion of a job script. Logical equivalents are equivalent expressions that execute or compile in an equivalent manner as an expression in the job query's script. A query script may have numerous equivalents that can be substituted for various portions of the original, and in one embodiment, selection of which equivalent may be based on comparing the computation costs for each equivalent. In one embodiment, the lowest cost governs which equivalents to use. Alternatively, time may be used to indicate which equivalents to use, so that equivalents will be selected that produce a final query that can be executed the quickest. Eventually, in one embodiment, the job query script is rewritten into a final query plan, which is a script or code that, when executed or compiled, produces the same result as the job query script.

Embodiments mentioned herein may take the form of a computer-program product that includes computer-useable instructions embodied on one or more computer-readable media. Computer-readable media include both volatile and nonvolatile media, removable and nonremovable media, and contemplates media readable by a database. The various computing devices, application servers, and database servers described herein each may contain different types of computer-readable media to store instructions and data. Additionally, these devices may also be configured with various applications and operating systems.

By way of example and not limitation, computer-readable media comprise computer-storage media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory devices can store data momentarily, temporarily, or permanently.

As used herein, "components" refer to a computer-related entity, either hardware, software (e.g., in execution), and/or firmware. Components may operate in a client-server relationship to carry out various techniques described herein. Such computing is commonly referred to as "in-the-cloud" computing. For example, a component may be a process running on a processor, a library, a subroutine, and/or a computer or a combination of software and hardware. By way of illustration, both an application running on a server and the server may be a component. One or more components can reside within a process, and a component can be localized on a computing device (such as a server) or distributed between two or more computing devices communicating across a network.

Referring initially to FIG. 1 in particular, an exemplary operating environment for implementing one embodiment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of illustrated component parts. In one embodiment, computing device 100 is a personal computer. But in other embodiments, computing device 100 may be a cell phone, smartphone, digital phone, handheld device, Black-Berry®, personal digital assistant (PDA), or other device capable of executing computer instructions.

Embodiments may be described in the general context of computer code or machine-useable instructions, including computer-executable instructions such as program modules, being executed by a computer or other machine, such as a PDA or other handheld device. Generally, machine-useable instructions define various software routines, programs, objects, components, data structures, remote procedure calls (RPCs), and the like. In operation, these instructions perform particular computational tasks, such as requesting and retrieving information stored on a remote computing device or server.

Embodiments described herein may be practiced in a variety of system configurations, including handheld devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation devices 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various hardware is not so clear, and metaphorically, the lines would more accurately be grey and fuzzy. For example, one may consider a presentation device, such as a monitor, to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 may include a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation device 116 presents data indications to a user or other device. Exemplary presentation components include a display device, speaker, printing component, vibrating component, etc.

Specifically, memory 112 may be embodied with instructions for a web browser application, such as Microsoft Internet Explorer®. One skilled in the art will understand the functionality of web browsers; therefore, web browsers need not be discussed at length herein. It should be noted, however, that the web browser embodied on memory 112 may be configured with various plug-ins (e.g., Microsoft SilverLight™ or Adobe Flash). Such plug-ins enable web browsers to execute various scripts or mark-up language in communicated web content. For example, a JavaScript may be embedded within a web page and executable on the client computing device 100 by a web browser plug-in.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
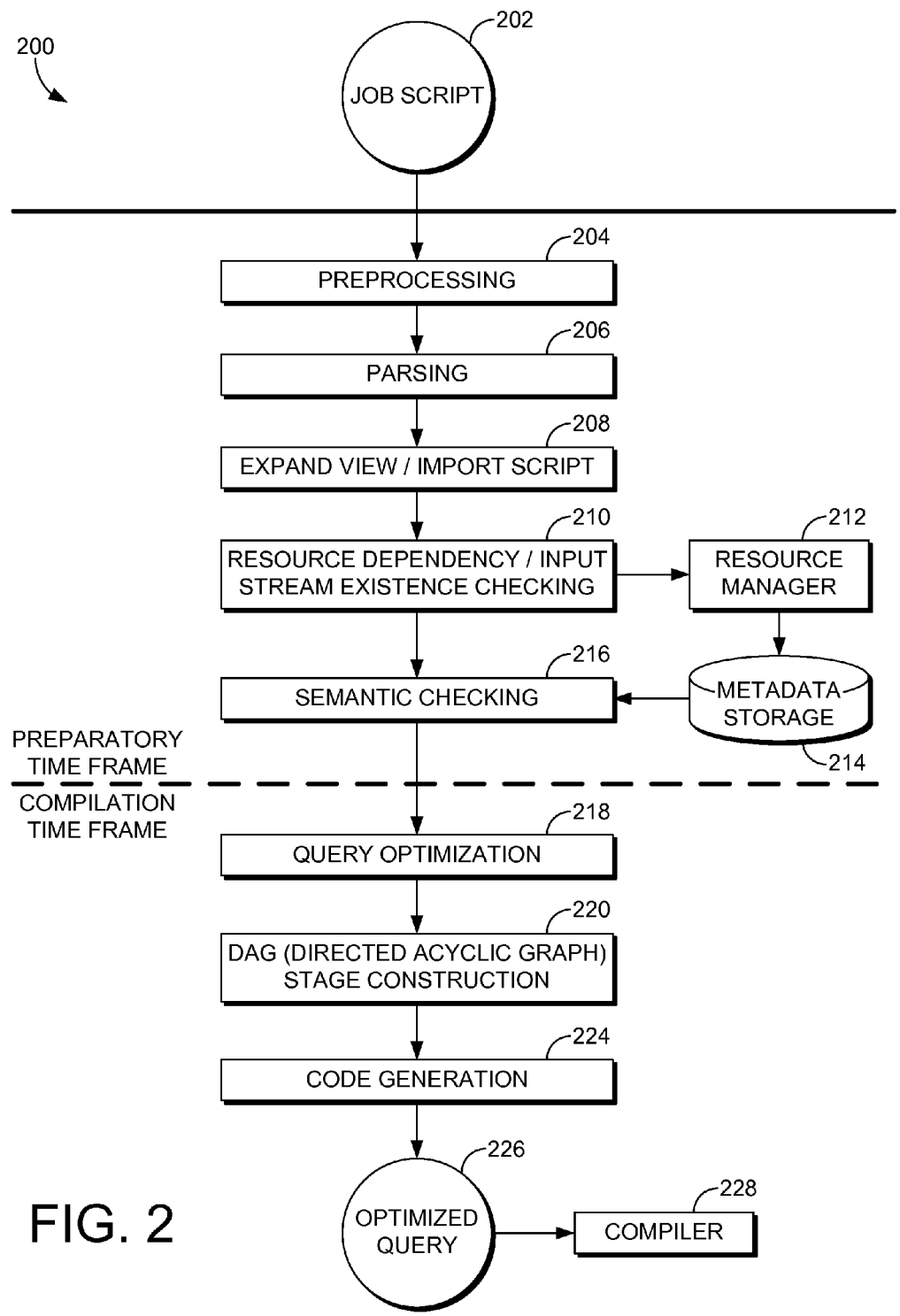
FIG. 2 is a block diagram of the processing of a job in different time frames, according to one embodiment.

FIG. 2 is a block diagram of the processing of a job in different time frames, according to one embodiment. Flow 200 illustrates several computational tasks being performed on a job 202 submitted by a user. The computational tasks are performed during two different time frames: a preparatory time frame and a compilation time frame. While the tasks are shown in a sequential manner, some embodiments will actually perform some tasks in parallel. Generally, computational tasks that require less processing time—or are less computationally intense—are performed during the preparatory time frame, leaving the more complex tasks for the compilation time frame. Flow 200 merely represents one embodiment and is not meant to limit all embodiments to any particular computational tasks or execution order of computational tasks. In addition, the depicted positioning of the preparatory time frame and the compilation time frame illustrate one embodiment, while other embodiments may perform different computational tasks during each of the two time frames where none, some, or all of the computational tasks are performed in the first time frame and none-some, or all of the computational tasks are performed in the second time frame.

Focusing on flow 200, a processing server receives job script 202 across a network. Preprocessing and parsing of the script is then performed, as shown at 204 and 206, respectively. In one embodiment, an abstract syntax tree may be generated after parsing and used to produce an expanded view of the job script, as shown at 204. Tasks 204 through 208 may be iteratively performed in some embodiments. Using the abstract syntax tree, resource dependencies and inputs are determined, as shown at 210. Determined resource paths and identified metadata may be sent to a resource manager 212 that retrieves dependent libraries (e.g., dynamic link libraries (DLLs)) and metadata from a memory store 214. Eventually, the semantics of the job query is checked, as shown at 216, which may involve analyzing the retrieved dependencies and metadata retrieved from memory store 214. After a semantics checking, a logical tree of the job script may be generated and later used in later tasks.

The processing hopefully completes tasks 204-216 during the preparatory time frame. Although not shown, a message may be sent to the user indicating which tasks have been completed during the preparatory time frame. Subsequently, flow 200 moves into the compilation time frame, for additional processing.

During the compilation time frame, the query of the job script is optimized, as shown at 218. Doing so may require access to the logical tree generated after semantics checking. In one embodiment, optimizing may include generating a physical tree from the logical tree of the job script, and the physical tree is used to generate an acyclic graph of the job script, as shown at 220. Afterwards, as shown at 220, the job script is turned into source code (e.g., C, C++, C#, JAVA, etc.), as shown at 224, that is stored as a source file. The source code represents an optimized query 226 of the job script that can be compiled (shown at 228) and turned into an executable the processing server can run. If compiling cannot be completed, an error message may be sent to the user.

Figure 3:
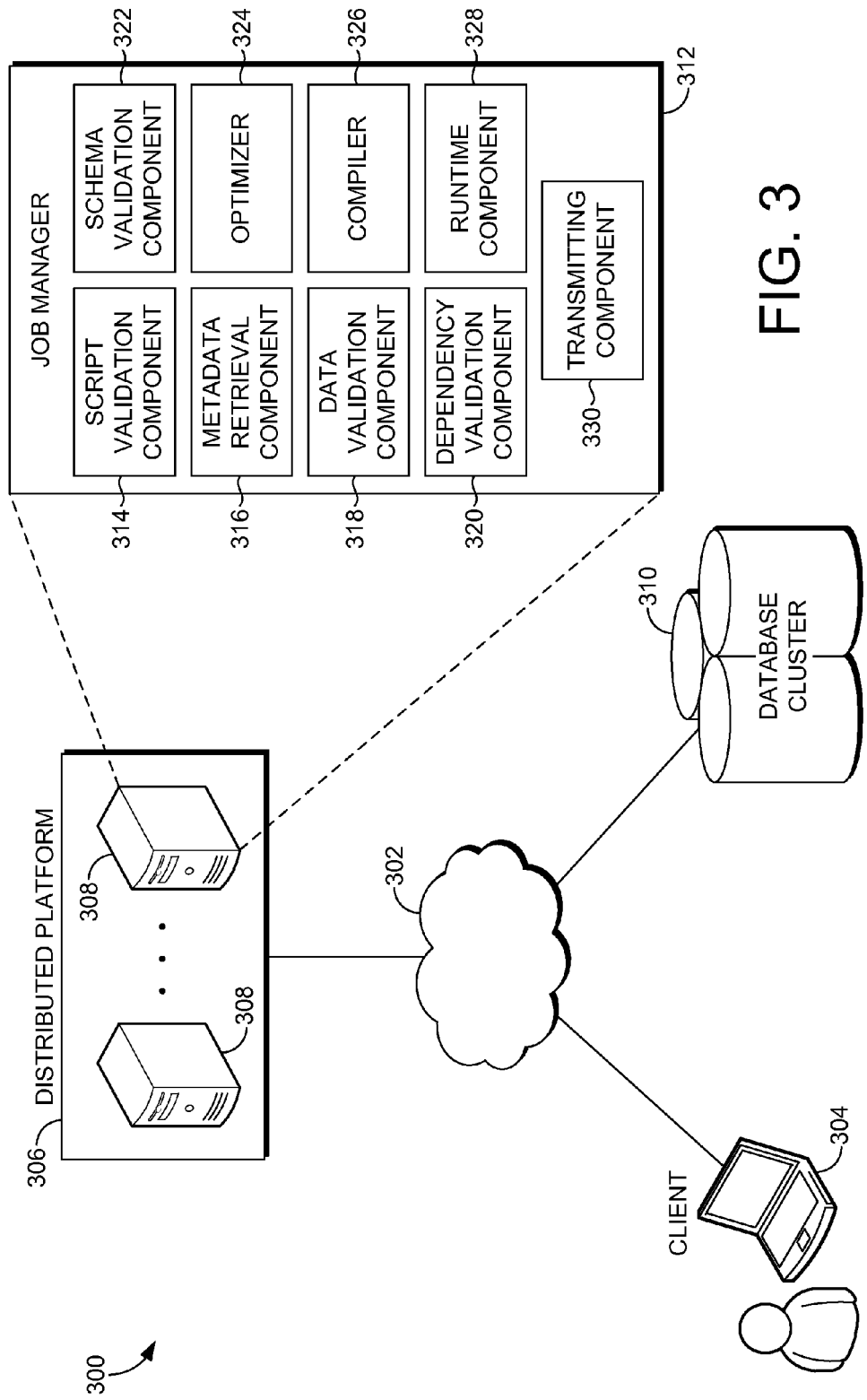
FIG. 3 is a diagram of a networking environment for processing jobs in a distributed framework, according to one embodiment.

FIG. 3 is a diagram of a networking environment for processing jobs in a distributed framework, according to one embodiment. Environment 300 illustrates several devices communicating across a network 302. A user sitting at client 304 submits jobs to distributed platform 306, which represents a group of communicatively connected servers 308 that are receiving and processing batches of jobs. Distributed platform 306 communicates with database cluster 310, which represents database servers storing data sets as well as information related to the data sets (e.g., metadata, schema, DLLs, and the like). Environment 300 depicts one embodiment, and others may include additional or fewer computing devices. For example, distributed platform 306 may be executed by one processing server 308, not multiple processing servers 308.

Client 304 may be any type of computing device, such as the device 100 described above with reference to FIG. 1. By way of example only but not limitation, client 304 may be a personal computer, a desktop computer, a laptop computer, handheld device, mobile phone, or other personal computing device. The user may submit jobs for processing from client 304 using either a web browser (i.e., by navigating to a particular web resource) or by way of a software application stored on client 304.

Distributed platform 306 represents one or more front-end processing servers configured to execute batches of jobs. Distributed platform 306 comprises one or more processing servers 308, and each processing server 308 may include its own processors; computer-readable media with server-based applications embodied thereon; database management software ("DBMS"); and any other hardware, software, and/or firmware necessary to perform the computational tasks described herein. In one embodiment, one or more of the processing servers 308 is configured with job manager 312, comprising: script validation component 314, metadata retrieval component 316, data validation component 318, dependency validation component 320, schema validation component 322, optimizer 324, compiler 326, run time component 328, and transmitting component 330. While environment 300 depicts components 314-330 located on one processing server 308, components 314-330 may actually be executed by different processing servers 308 in the distributed platform 306. The components (314-330) of job manager 312 are illustrated for explanatory purposes, not to limit the embodiments described herein to any particular components.

Database cluster 310 represents a collection of database servers that are configured to store various data sets. One skilled in the art will appreciate that each database server includes a processing unit, computer-readable media, and database-server software. Database-server software may include any well-known database application or management software.

Network 302 facilitates communication between the different devices in environment 300. Network 302 may include any computer network or combination thereof. Examples of networks configurable to operate as network 302 include, without limitation, a wireless network, land line, cable line, fiber-optic line, local area network ("LAN"), wide area network ("WAN"), or the like.

In operation, the user submits a job from client 304 to distributed platform 306. The job may come in the form of a submitted script (e.g., SCOPE, structured query language ("SQL"), or the like). Client 304 may only be connected to distributed platform 306 for a limited amount of time, such as the amount of time an HTTP 408 Error is issued. Upon receiving the job, the processing servers 308 perform several computational tasks using the components of job manager 312. Script validation component 314 checks that the script is in proper form. Metadata retrieval component 316 identifies metadata relevant to data sets queried by the job, and fetches the metadata from database cluster 310. Data validation component 318 verifies that data requested by the job actually exists and is stored on the database cluster 310. Dependency validation component 320 verifies that any dependent libraries (e.g., DLLs) exist and can be accessed for later processing of the job. Schema validation component 322 determines whether schema associated with the data sets being queried by the job exist and/or are valid. None, some, or all of these five components (314, 316, 318, 320, and 322) are processed, in one embodiment, by the distributed platform 306 within a predefined time frame. In one embodiment, the predefined time frame is an amount of time necessary to answer the user at the client 304 before the network connection between the client 304 and the distributed platform 306 is disrupted. For example, the predefined time frame may be a period less than the amount of time before an HTTP 408 Error is issued.

Transmitting component 330, which comprises an I/O interface, transmits a message to client 304, indicating that certain computational tasks have been performed on the job. This message is sent when the predefined time frame expires, allowing, in some embodiments, the user to always receive a message back from distributed platform 306 before a network connection is lost.

The message informing client 304 that certain computational tasks have been performed may be sent at different times after none, some, or all of the computational tasks are performed. In one embodiment, the message is sent after a time frame less than the time a network connection can remain open before issuing an HTTP 408 Error. In another embodiment, the message is sent after specific computational tasks are performed. For example, the message may be sent after a job syntax is checked, metadata has been retrieved, and schema have been verified, or any combination of computational tasks have been performed. In another embodiment, the time frame is set based on an analysis of the time needed to complete each computational task on the job, thus making the time frame job specific. For example, a complex job with a computationally intense query may require significant optimizing and compiling time compared to less complicated jobs. Therefore, the message may be sent before optimizer 324 and compiler 326 optimize and compile the script, respectively. As a result, preparatory computational tasks (syntax checking, data validation, metadata retrieval, and schema validation) can be completed during the predefined time frame, and the user is alerted to the fact that the job at least passes these preparatory tasks while the distributed platform takes additional time performing more computationally intense tasks (i.e., optimizing, compiling, and executing). So while some embodiments use a predefined time frame before transmitting the message, other embodiments dynamically determine the time frame based on the computational complexity of the job.

When the time frame expires, distributed platform 306 reports all computational tasks have been performed. Alternatively, distributed platform 306 may report only that certain specific computational tasks have been completed. For example, if the distributed platform 306 completes checking the syntax of a job, validating relevant schema, verifying existence of relevant dependencies, and optimizing the job, distributed platform 306 may be configured to only report that the job passed syntax checking.

Tradeoffs exist when optimizing the script of a job. On the one hand, increased optimization leads to less time compiling and/or executing processing. On the other hand, additional optimization requires additional resources and time. In one embodiment, optimizer 324 considers the predefined time frame when deciding how far to optimize the job script. For example, if optimizer 324 can finish a rudimentary optimization of the job script before the time frame expires, optimizer 322 may do so in order to provide an indication that optimization has been completed in the message sent to the user. Alternatively, optimizer 322 may be configured to perform a more robust optimization of the job script because the time frame has already expired or will likely expire before a rudimentary optimization can be completed. Thus, optimization can be dynamically tailored by optimizer 324 based on the predefined time frame and/or the complexity of the job.

In one embodiment, compiler 326 compiles the optimized code generated by optimizer 324, generating an executable for distributed platform 306 to run. If compiler 326 finishes compiling within the predefined time frame, the message to the user may indicate that compiling has occurred. Some embodiments may not indicate compiling, however. More-over, run time component 328 runs the executable, interacting with the data set stored in database cluster 310. The resultant answer from running the executable may be transmitted to client 304 by transmitting component 330.

Figure 4:
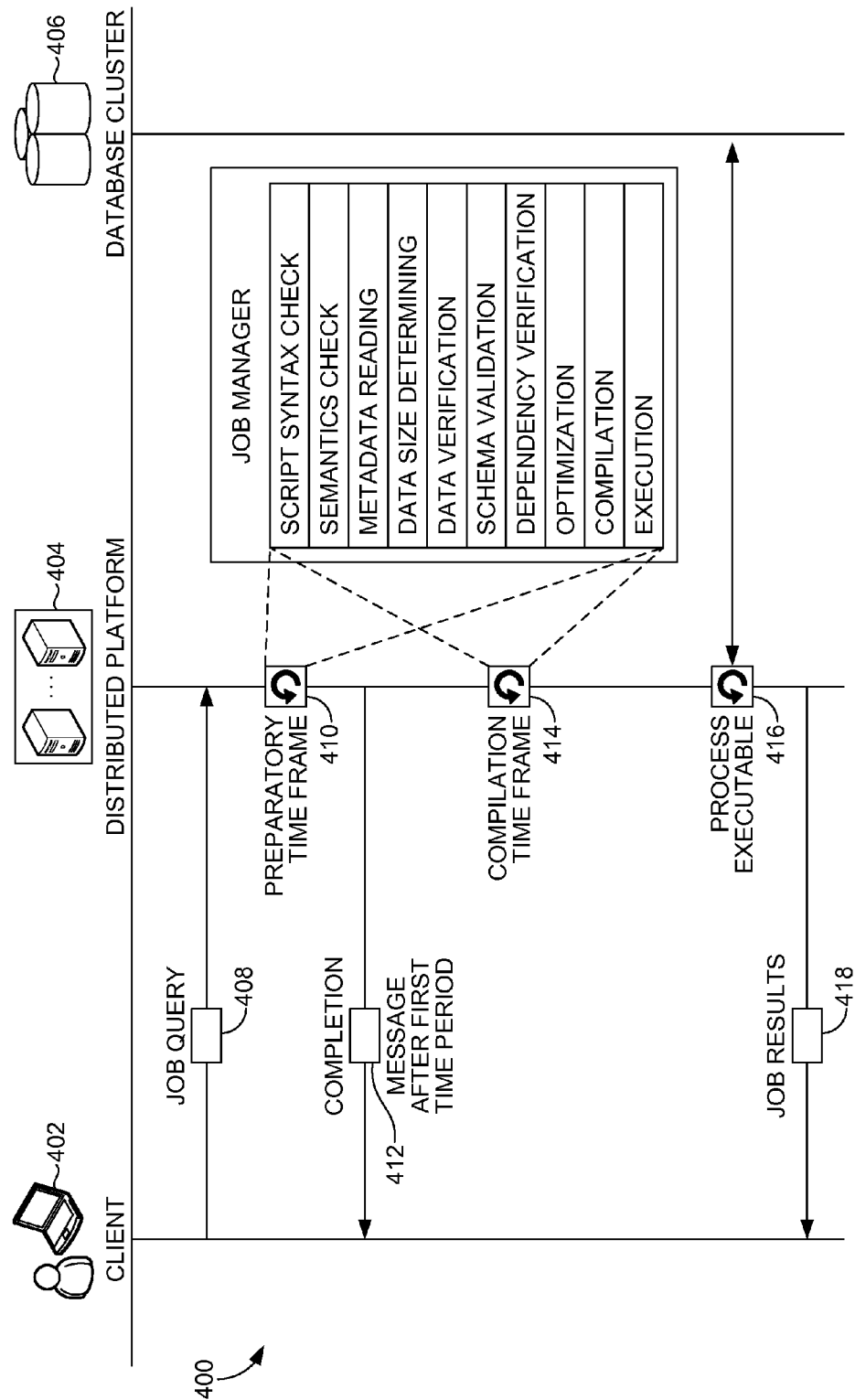
FIG. 4 is a diagram of the processing of a job in different time frames, according to one embodiment.

FIG. 4 is a diagram of the processing of a job in different time frames, according to one embodiment. Environment 400 illustrates interactions between a client 402, distributed platform 404, and database cluster 406 across a network (not shown). A user at client 402 submits a job query to distributed platform 404 (as shown at 408). Distributed platform 404 comprises one or more processing servers that receive the job query and determine a preparatory time frame 410 to complete necessary computational tasks on a job query. In one embodiment, the computational tasks include checking the job query's script syntax, checking the job query's semantics, reading or retrieving metadata associated with the job query, determining the size of the queried data set, verifying that the data set exists, validating schema associated with the data set, verifying any dependencies in the job query, optimizing the job query, compiling the job query, and executing the job query. Distributed platform 404 performs these computational tasks while monitoring whether the preparatory time frame expires. When the preparatory time frame expires, distributed platform 404 transmits a completion message to client 412, alerting the user that the job has passed and/or failed certain computational tasks and what computational tasks have been completed.

Any combination of computational tasks, including none, some, or all of the tasks, may be performed during preparatory time frame 410. In one embodiment, when computational tasks scheduled for completion during preparatory time frame 410 have been completed before expiry of preparatory time frame 410, distributed platform 404 moves on to completing the remaining computational tasks. In another embodiment, distributed platform 404 continues to process the remaining computational tasks during the compilation time frame 414, which refers to the time after the preparatory time frame. For example, distributed platform 404 may finish checking the script and semantics of the job query at the time the preparatory time frame 410 expires, indicate so in completion message 412, and continue with the remaining computational tasks during the compilation time frame 414. After all computational tasks are performed, and an executable has been generated, distributed platform 404 processes the executable at 416. Job results 418 can then be sent back to client 402 for the user to view.

As previously, preparatory time frame 410 and compilation time frame 414 may be predefined or dynamically set for various reasons. In one embodiment, preparatory time frame 410 is based on the amount of time client 402 remains connected to distributed platform 404—for example, to avoid an HTTP 408 Error. In an alternative embodiment, the preparatory time frame 410 is set based on the complexity of the computational tasks needing to be performed on the job query. Along those lines, optimization of the job query may be performed before preparatory time frame 410 expires.

Figure 5:
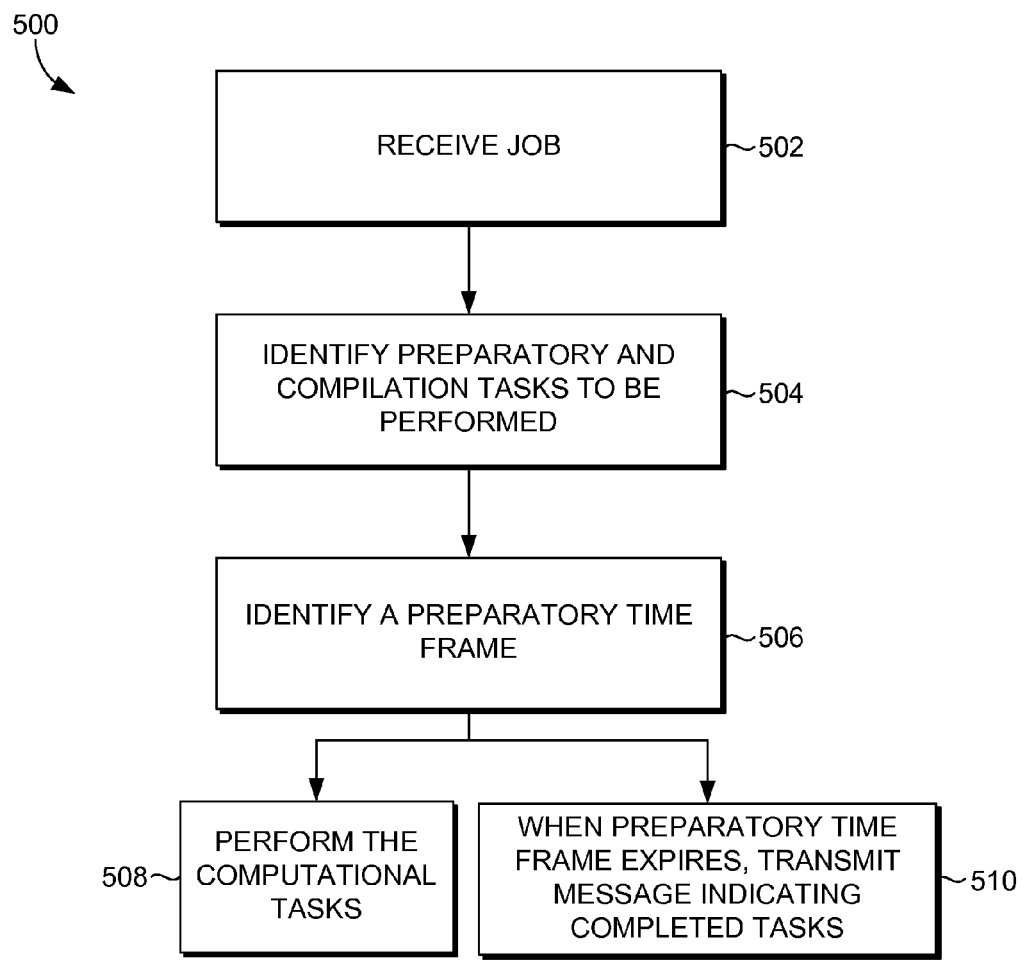
FIG. 5 is a diagram illustrating a flowchart of the processing of a job in different time frames, according to one embodiment.

FIG. 5 is a diagram illustrating a flowchart 500 of the processing of a job in different time frames, according to one embodiment. Initially, a job is received by a processing server, as shown at 502. Preparatory and compilation tasks to be completed on the job are identified, as shown at 504. Examples of tasks include, without limitation, preprocessing, parsing, importing, verifying dependencies, retrieving relevant metadata, checking syntax and semantics, optimizing, compiling, and running. Any combination of the tasks mentioned herein may be organized as preparatory or compilation tasks. As shown at 506, an initial time frame for completing some or all of the preparatory tasks is identified. The time frame may be based on a predefined time or dynamically set based on computational intensity of the preparatory and/or compilation tasks to be performed on the job or the complexity of the query in the job.

In one embodiment, the preparatory tasks and the compilation tasks are strategically ordered for completion. The strategic order may be based on a predefined list of computational tasks that should be performed before expiry of the time frame. Alternatively, the strategic order may be based on the computational intensity of the tasks. For example, optimizing and compiling tasks may be performed later because these tasks generally require more resources than others.

The preparatory and compilation tasks are processed in the strategic order, as shown at 508. Once the preparatory time frame expires, a message is transmitted to a client computing device, indicating which preparatory and/or computational tasks the job has passed and/or have been completed, as shown at 510. Any remaining computation tasks are thereafter completed.

Figure 6:
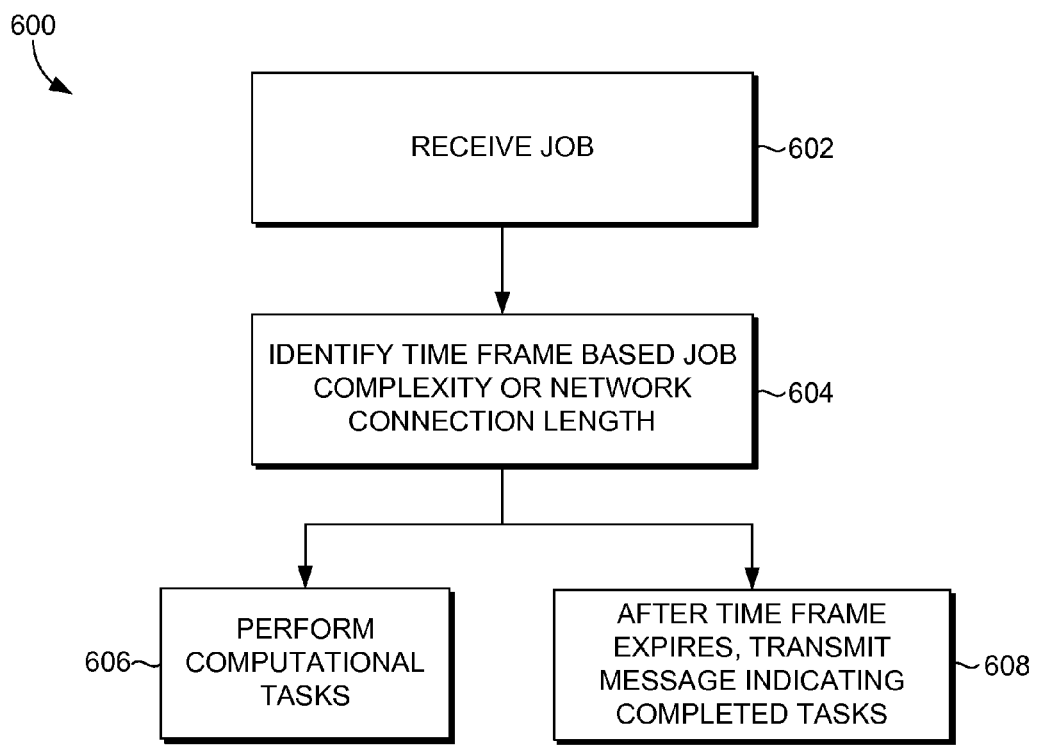
FIG. 6 is a diagram of a flowchart for processing jobs in a distributed framework, according to one embodiment.

FIG. 6 is a diagram of a flowchart 600 for processing jobs in a distributed framework, according to one embodiment. Initially, a user submits a job to be processed, as shown at 602. A time frame is determined for completing computational tasks, as shown at 604; furthermore, the time frame is based on either complexity of the job or the length of time a processing server is connected online to a client computing device. Computational tasks are identified in order for a processing server to process the job, as indicated at 604. Examples of tasks include, without limitation, preprocessing, parsing, importing, verifying dependencies, retrieving relevant metadata, checking syntax and semantics, optimizing, compiling, and running. Any combination of the tasks mentioned herein may be organized as preparatory or compilation tasks. The computational tasks are performed, as shown at 606. Once the time frame expires, a message is transmitted to the client computing device—or whatever computing device a user can access—indicating what tasks have been completed, as shown at 608. Processing for the rest of the uncompleted tasks continues after the message has been sent.

The illustrated steps are not limited to a sequential manner, as some embodiments will perform the steps in parallel or out of the sequence illustrated. Furthermore, although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. For example, sampling rates and sampling periods other than those described herein may also be captured by the breadth of the claims.

The invention claimed is:

1. One or more computer hardware devices storing computer-executable instructions that, when executed by a processor, perform a computer-implemented method for processing one or more jobs in a distributed batch query-processing platform, comprising:
   receiving a job in the distributed batch query-processing platform;
   identifying preparatory tasks and compilation tasks to be completed on the job, at least a portion of the preparatory tasks and compilation tasks to be completed in a sequential manner, wherein the identified preparatory tasks include a plurality of preprocessing, parsing, importing, verifying dependencies, retrieving relevant metadata, checking script syntax, or checking semantics of the job, and wherein the compilation tasks include optimizing and compiling;

determining two time frames including a preparatory time frame and a subsequent compilation time frame prior to execution of the job;

within the preparatory time frame, performing a portion of the identified preparatory tasks before expiration of the preparatory time frame, based on an amount of time required to perform the portion of the identified preparatory tasks;

after the preparatory time frame expires, transmitting a message to a client device indicating which of the identified preparatory tasks were completed within the preparatory time frame; and subsequent to the preparatory time frame, within the compilation time frame,
(1) performing any remaining identified preparatory tasks that were not performed in the preparatory time frame, and
(2) performing the compilation tasks;

wherein the preparatory time frame is determined based on at least one of the complexity of the tasks or an amount of time necessary to maintain an established communication connection for transmitting the message, and the compilation time frame is determined based on a predefined time or a complexity of the job.

2. The one or more devices of claim 1, wherein the job is coded in a scripting language.

3. The one or more devices of claim 2, wherein the scripting language is structured computations optimized for parallel execution ("SCOPE").

4. The one or more devices of claim 1, wherein the preparatory tasks comprise reading metadata indicated by the script syntax of the job.

5. The one or more devices of claim 1, wherein the preparatory tasks comprise validating schema of variables identified by the job.

6. The one or more devices of claim 1, wherein the preparatory tasks comprise locating a dynamic link library (DLL) indicated by the job.

7. The one or more devices of claim 1, wherein the compilation tasks comprise optimizing script of the job by performing at least one member of a group comprising:
applying transformation rules to query subexpressions;
enumerating equivalent logical rewrites and implementations for a portion of the query;
estimating costs necessary for implementing the equivalent logical rewrites, wherein the costs are based on required computational resources necessary to implement each of the equivalent logical rewrites;
comparing the costs for each of the equivalent logical rewrites; and
selecting one or more logical equivalent rewrites corresponding to the lowest cost and using the one or more logical equivalent rewrites to convert the job into an execution query plan.

8. The one or more devices of claim 1, wherein the compilation tasks comprise compiling script associated with the job.

9. The one or more devices of claim 1, wherein the compilation tasks comprise compiling script associated with the job and generating an executable.

10. The one or more devices of claim 1, wherein an order of the sequential manner is based the computational intensity of the preparatory and/or compilation tasks.

11. A computer-implemented method for processing one or more jobs in a distributed batch query-processing platform, comprising
receiving a job in the distributed batch query-processing platform;
identifying preparatory tasks and compilation tasks to be completed on the job, at least a portion of the preparatory tasks and compilation tasks to be completed in a sequential manner, wherein the identified preparatory tasks include a plurality of preprocessing, parsing, importing, verifying dependencies, retrieving relevant metadata, checking script syntax, or checking semantics of the job, and wherein the compilation tasks include optimizing and compiling;
determining two time frames including a preparatory time frame and a subsequent compilation time frame prior to execution of the job;
within the preparatory time frame, performing a portion of the identified preparatory tasks before expiration of the preparatory time frame, based on an amount of time required to perform the portion of the identified preparatory tasks;
after the preparatory time frame expires, transmitting a message to a client device indicating which of the identified preparatory tasks have been completed; and
subsequent to the preparatory time frame, within the compilation time frame,
(1) performing any remaining identified preparatory tasks that were not performed in the preparatory time frame, and
(2) performing the compilation tasks;
wherein the preparatory time frame is determined based on at least one of the complexity of the tasks or an amount of time necessary to maintain an established communication connection for transmitting the message, and the compilation time frame is determined based on a predefined time or a complexity of the job.

12. The computer-implemented method of claim 11, wherein the time frame is set based on a length of time the client device maintains a connection to a processing server without transmitting data before an HTTP error is issued.

13. The computer-implemented method of claim 11, wherein the compilation tasks comprise
generating an executable for the job.

14. The computer-implemented method of claim 11, wherein identifying the preparatory time frame further comprises selecting the preparatory time frame based on a network portal being open to a client computing device.

15. A server in a distributed batch query-processing platform, comprising:
one or more processors configured to receive a job in the distributed batch query-processing platform and identify preparatory tasks and compilation tasks to be completed on a job, at least a portion of the preparatory tasks and compilation tasks to be completed in a sequential manner, and to execute the preparatory tasks within a preparatory time frame, including a plurality of:
(1) execute a preprocessing component,
(2) execute a parsing component,
(3) execute an importing component,
(4) execute a dependency component to verify dependencies,
(5) execute a metadata component to retrieve relevant metadata,
(6) execute a syntax component for checking syntax of a job, and (7) execute a semantics component for checking semantics of the job;

one or more processors configured to determine two time frames including the preparatory time frame and a subsequent compilation time frame prior to execution of the job;

one or more processors configured to perform, within the preparatory time frame, a portion of the identified preparatory tasks before expiration of the preparatory time frame, based on an amount of time required to perform the portion of the identified preparatory tasks;

one or more processors configured to transmit a message to a client device indicating which of the preparatory tasks were completed within the preparatory time frame; and one or more processors configured to execute the compilation tasks within the compilation time frame subsequent to the preparatory time frame, including
(1) execute an optimizer, and
(2) execute a compiler configured to compile the job;

wherein the preparatory time frame is set based on at least one of the complexity of the tasks or an amount of time that an online connection with the client device is open, and the compilation time frame is determined based on a predefined time or a complexity of the job.

16. The server of claim 15, wherein the optimizer is further configured to alter the order of tasks based on the computational intensity of the preparatory and/or compilation tasks.

* * * * *